United States Patent Office 2,921,278
Patented Jan. 12, 1960

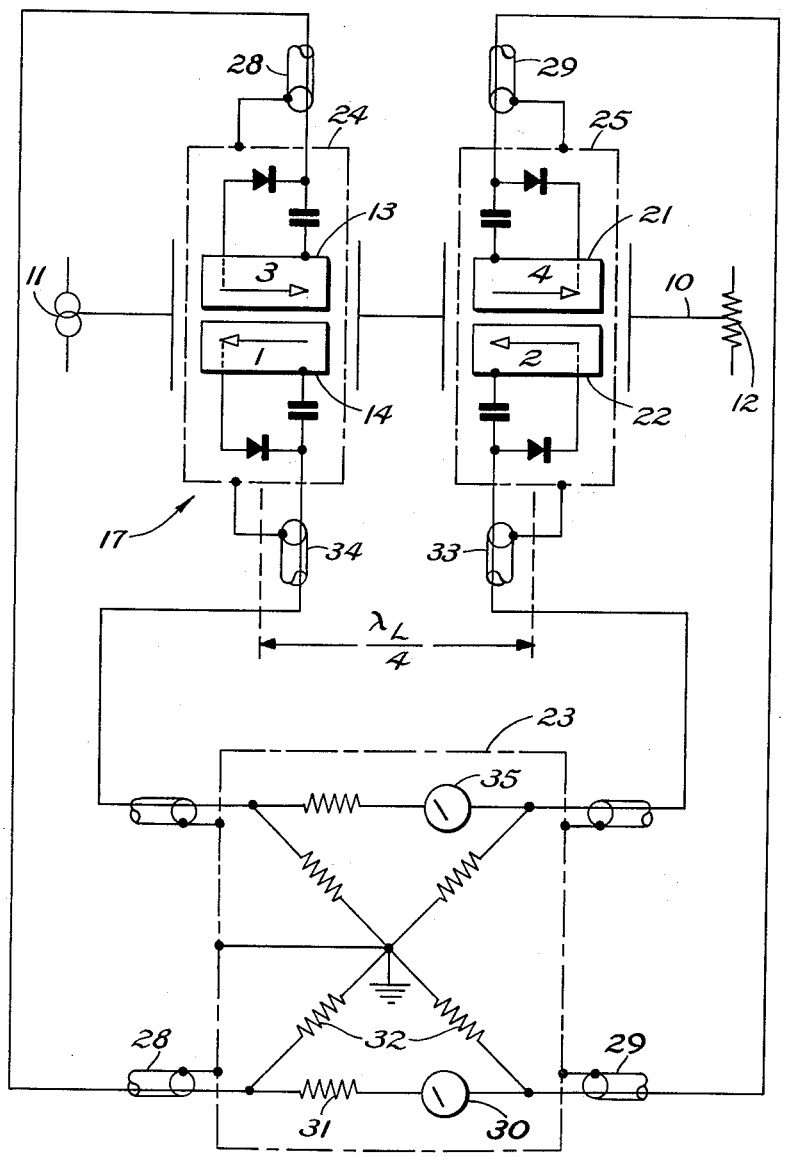

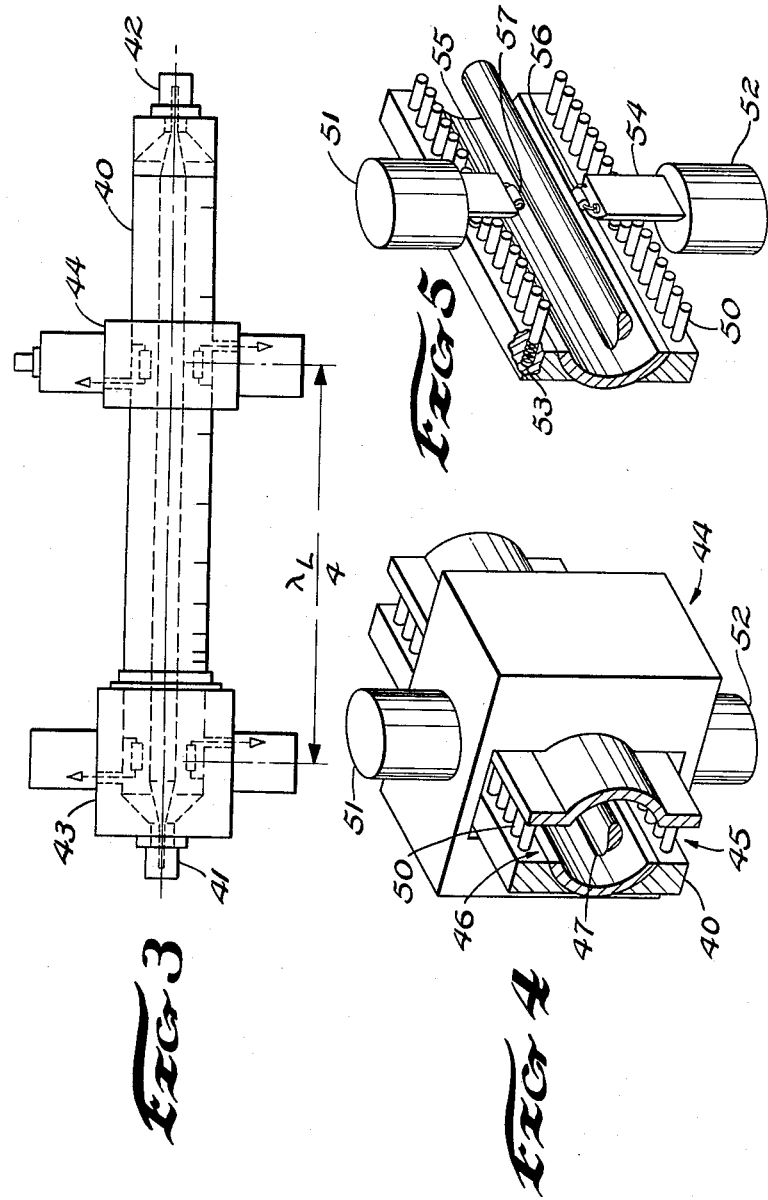

2,921,278

ARRANGEMENT OF DIRECTIONAL COUPLERS FOR INCREASING EFFECTIVE DIRECTIVITY

Edwin N. Phillips, Cedar Rapids, Iowa, assignor to Collins Radio Company, Cedar Rapids, Iowa, a corporation of Iowa Application August 17, 1956, Serial No. 604,831

1 Claim. (Cl. 333—97)

This invention relates to the transmission of energy, and more particularly, to power measuring devices therefor.

Prior art methods for measuring power flow in waveguides or other high frequency modes of conducting electromagnetic energy have been dependent on low voltage standing wave ratios at the point of measurement. Further, the usual device has not been arranged to show completely the power flow with the result that reduction of a meter reading of backward power flow may only be the lessening of the power input. Even further, the usual directional coupler and prior arrangements of it in cascade has not yielded high directivity.

It is an object of this invention to provide a power meter arrangement which is capable of depicting the full story on the power flow of electromagnetic energy in or on high frequency conductors.

It is a further object of this invention to provide a power meter with a directional coupler array which yields a higher directivity than any one component coupler, with a relatively greater insensitivity to frequency variations.

It is a further object of this invention to provide a power meter with a directional coupler array which is adjustable as to frequency of operation, enhancing even further the frequency range capabilities of the invention.

It is an even further object to provide improved metering circuits for directional couplers.

It is a feature of this invention that couplers having relatively poor directivity are used in arrays which yield laboratory standard characteristics.

It is a further feature of this invention that metering circuits yield precisely all the necessary information as to power flow in the conductor.

It is a further feature of this invention that the coupler arrays need have no compensation of the voltage standing wave ratio arising from their presence, the coupling with the conductor being so slight as a consequence of their use as indicators in contrast to power dividing networks.

Further objects, features, and advantages of the invention will become apparent from the following description and claim when read in conjunction with the drawings, in which:

Figure 2 shows a schematic of a preferred form of the invention, including the metering circuits, Figure 3 shows a top view of the invention embodying the circuits of Figure 2 in a coaxial line type of conductor, Figure 4 shows a perspective view of a portion of the device of Figure 3, and Figure 5 shows a section of Figure 4.

Figure 1:
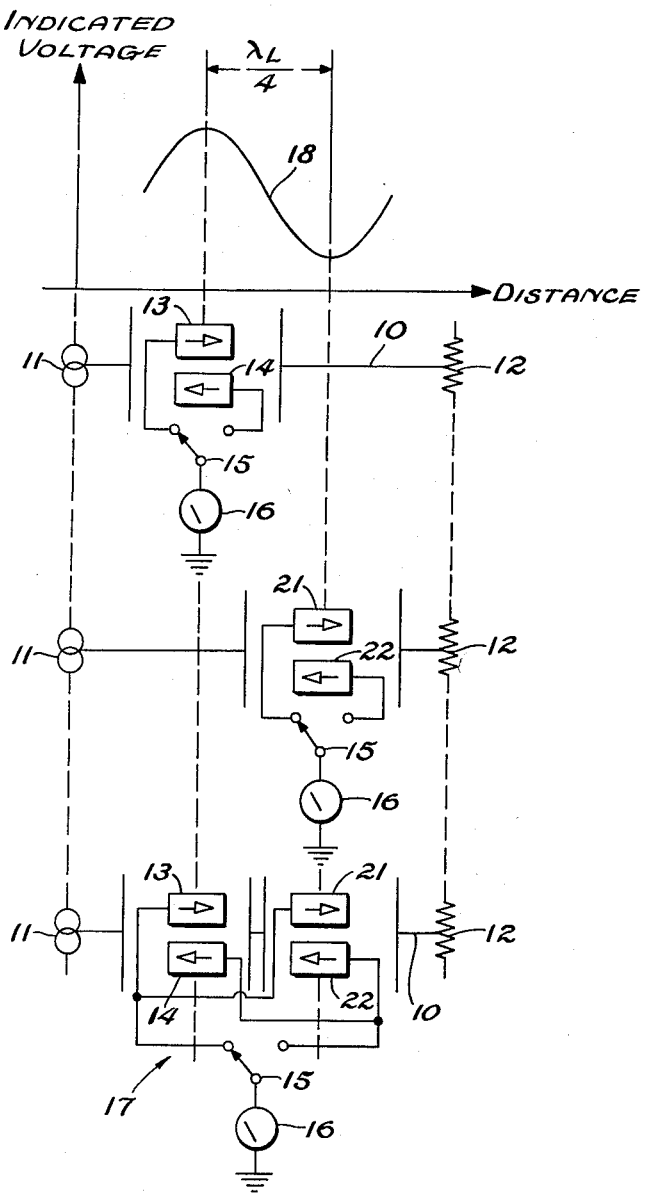
Figure 1 shows development of a form of the invention from the prior art.

Development of the invention is shown in Figure 1. In a transmission line 10, between source 11 and load 12 are inserted a pair of directional couplers 13, 14, shown as boxes with an arrow indicating the sensitivity of the coupler to energy flow therethrough. A switch 15 permits connection of meter 16 to a selected one of the couplers for measurement of power in that direction.

This arrangement, per se, however, has no better characteristics than the coupler standing alone. Further, the power indication has an error caused by, and in direct relation to, the voltage standing wave ratio.

Similar use of the array at a different point in the transmission line has the same flaws. As may be seen by reference to the standing wave 18 above the first coupler pair, the maximum set of readings for one power flow direction is found at the peak of the standing wave variation. With a similar coupler pair at the null, the minimum set of readings are seen by the coupler array.

Thus, positioned at a voltage minimum in the transmission system between load 12 and source 11, incident power sensing coupler 21 and reflected-power sensing coupler 22 give meter 16 a different set of readings from those of couplers 13, 14.

The two positions thus illustrated are the extremes of the usual mode of measurement by directional couplers. The couplers cannot be specifically set to these positions by choice, however, nor can one be sure just what the voltage standing wave ratio is, for correction of the readings. The imperfect directivity or failure by coupling to the opposite direction of power flow of the couplers available enters into this error also. It should be obvious that the reflected-power measurement is greatly dependent on the directivity of the related coupler in eliminating the incident power as a spurious response.

The use of directional couplers infra is taken to be so light that compensation of coupler-induced voltage standing wave ratio is unnecessary. These couplers are purely voltage sampling, in contrast to power dividers, yielding indications very nearly proportional to the quantities existing within the transmission system.

The lowermost coupler array of Figure 1 shows a simplified form of the invention. Here two forward-looking couplers, which outputs are added, and two backward-looking couplers, which outputs also are added, are spaced one-quarter wavelength apart in the transmission system metered.

Here a load 12 is fed by a transmission system 10 from a power source 11. A metering system 17 is inserted into line 10. At one point in the line 10 a pair of directional couplers are inserted; one, 13, couples energy flowing to the load, while the other, 14, couples energy flowing back from the load. Substantially one-quarter wavelength from said point is a second pair of couplers; one, 21, couples to forward-flowing energy, and the other, 22, couples to energy flowing back from the load. The outputs of respective directions are shown added schematically at switch 15. Switch 15 permits use of meter 16 for measurement of either direction-flowing power.

This arrangement yields an indication accuracy roughly double that of the comparable accuracy of a single coupler. This is notable further when it is considered that separately used couplers at this same spacing are capable of only one-half their single-coupler accuracy. Other improved characteristics result from the new arrangement. Measurements of voltage standing wave ratios, power-ratio, net-power-flow, incident and reflected power-flow are enhanced. At an eight to one voltage standing wave ratio, ganged fifteen decibel couplers read the forward power-flow to better than one-tenth of a decibel accuracy. Use of unity directivity couplers (probes) requires more critical matching, requiring the reduction of the voltage standing wave ratio to one and one-third to one, for the same indication accuracy.

Figure 2 shows a more detailed form of the invention of Figure 1. An improved metering circuit also is shown, in dashed line box 23, which utilizes the improvements of the directional coupler array.

In Figure 2 transmission line 10 couples source 11 to load 12. A directional coupler array 17 is inserted in line 10 as described in Figure 1. Elements having the same characteristics here are numbered the same as in Figure 1.

The diodes and filter capacitors utilized in the directional coupler are shown to emphasize more clearly the metering problem formed in this array. While the Figure 1 circuits are shown with outputs tied together, symbolically, for the addition operation, the crystal diodes available for usual high-frequency applications do not lend themselves to simple parallelling. Voltage from one diode affects the rectification of the other shunting diode, resulting in an incorrect reading.

The coupler pair at a point on the line 10 nearest the source 11 is shown in a dashed line box 24, while that pair nearer the load is shown in a box 25; boxes 24 and 25 are units associated with the transmission line. Metering connections are made by coaxial lines to a remote meter box 23.

Lines 28 and 29 couple the forward-looking couplers nearer the source and load respectively to meter 30. A series resistor 31 is added where necessary to enhance the high series resistance of meter 30 to provide additional buffering between the two crystal diodes. It is to be noted that this pair of crystal diodes is arranged so that the output voltages from each diode is of opposing polarity. Thus, the series circuit of meter 30 and the two diodes, although shunted by diode load resistors 32 in the meter box, perform the necessary addition of the indications of the two couplers in the forward direction.

Similarly coaxial cables 33 and 34 couple the backward-looking couplers to a meter 35. The crystal diodes and the metering circuit are the same as that for the forward-looking circuit.

Series resistor 31, in both circuits, can be adjusted for any meter characteristic desired, but is preferably such that meter current is proportional to the square of the voltage output of the source-nearer coupler. Because the coupler output voltage is proportional to the transmission line voltage, the meter current is then proportional to the power flowing in that direction.

With the meter box 23 showing simultaneously forward and backward power and readily positioned at a desired remote point, the effects of adjustment in the system may be followed directly. Further, the use of four couplers having forty decibels directivity in this array gives results approaching the theoretically perfect coupler of infinite directivity.

Figures 3, 4, and 5 show embodiments of the invention of Figures 1 and 2 in a coaxial transmission line; Figure 2 shows the meter circuit used in Figures 3–5.

In Figure 3 an enlarged coaxial line section 40 is arranged with coaxial fittings for insertion in a transmission line. Fitting 41 is conveniently connected to a power source, and fitting 42 is then connected to a line leading to a load. Section 40 is arranged with tapered end sections to avoid change of characteristic impedance from that of the associated line.

On section 40 are mounted two coupler arrays. One, 43, is fixed to the end of section 40 adjacent the power source. The other, 44, is movable along the length of the section.

For sake of illustration, the individual directional couplers are shown as the resistive-loop type. It is to be understood, however, that any type of coupler, including the Bethe-hole coupler, may be used in place of these resistive-loops. Also, while a transverse electric mode concentric type of transmission line is shown, any type of line or system may be used. Also exemplary, rather than enumerative of specific examples, of what the term "transmission line" is intended to cover, are the screened or unscreened open-wire pair, and the dielectrically-cored waveguide. The line-wavelength, $\lambda_L$, is used here as definitive of a wavelength of the energy transmitted by the line; where air-cored lines are used, $\lambda_L$ is then equal to the usual free-space wavelength.

Figure 4 shows the details of coupler pair 44 in perspective. Line 40 has two longitudinal slots 45 and 46 diametrically opposite. Center conductor 47 is coaxial with the external conductor, and of such radius as to have the same characteristic impedance as the line in which this is to be inserted. Closing slots 45, 46 are a series of transverse pins 50 movable on their own longitudinal axis. Cans 51, 52 contain the rectifier and capacitor for the respective directional couplers. Assembly 44 is movable along the axis of the coaxial line 40.

Figure 5 shows Figure 4 skeletonized. Pins 50 are more easily seen here. Each pin has a spring 53 behind it in the mounting hole, urging the pin against the opposite side of the slot. The pins are spaced only slightly more than their width along the longitude of the slot. Cans 51, 52 have probes or tongues 54, 55 projecting therefrom past the shield pins into the slots 45, 46. The tongue is shaped in section somewhat like a circular segment so that the pins are "cammed" aside by axial motion of the assembly 44. This camming pushes each pin back into its hole sequentially to permit the yet-shielded passage of the tongue.

The ends of the tongues are terminated even with the inside of the outer conductor to reduce their effect on the self-induced voltage standing wave ratio. Mounted on the ends thereof are the couplers; in this illustration of the invention resistances 56 and 57 are mounted on tongues 54 and 55, respectively. In accord with couplers of this type, one end each of these resistors is grounded to the end of the tongue, while the other end is carried through, insulated, to the rectifier mounted in the can. The end of the resistor, relative to the axis of the line, which is grounded determines the direction of power flow to which the coupler is sensitive.

While frequency variation will change the coupling to some extent, known methods in the art of compensating resistive-loop directional couplers for outputs substantially independent of frequency enhances the directivity of this array over a wide frequency band. For further extension of bandwidth over which the array is operable with a high directivity, the number of couplers within a half-wavelength can be increased from two to a larger plurality. As with the two coupler array, the enhanced directivity is always greater than the unit coupler's directivity. For three couplers spaced $$\frac{\lambda_L}{8}$$

on the line, the bandwidth, for a directivity never less than triple a single coupler directivity, is from 0.75 to 2.25 of the design center frequency. Three forty decibel couplers spaced 14.76 inches each in an array length of 29.53 inches have a directivity of 49.54 decibels or better over a band of frequencies from 100 megacycles per second to 300 megacycles per second, the spacing being fractions of the wavelength at the design center of 133.33 megacycles.

The practical limit of this extension of the invention is a solid array a half line wavelength long, while the effective directivity improves increasingly slowly with additional couplers.

Other spacings than equal, such as binomial or Tchebyscheff distributions of the couplers reduce the bandwidth without other appreciable advantage.

Indication of a plurality of more than two couplers is impossible with the meter circuits shown in Figure 2. Use of a corresponding plurality of cathode followers to superimpose currents on a single meter is one way of establishing the meter circuitry.

Although this invention has been described with respect to particular embodiments thereof, it is not to be so limited because changes and modifications may be made therein which are within the full intended scope of the invention as defined by the appended claim.

I claim:

A directional coupler array comprising a transmission line, said transmission line having a surface defining a boundary to the energy transmitted thereby, a slot in said surface, said slot having transverse and longitudinal dimensions, a plurality of pins extending transversely of said slot, spring means urging said plurality of pins thereacross, the width of said plurality of pins substantially closing said slot along said longitudinal dimension; and a probe, a portion of said probe perpendicularly inserted through said slot, said probe additionally containing a camming means for slideably moving said pins away from the opposite side of said slot thereby permitting entry and longitudinal movement of said probe.

References Cited in the file of this patent

UNITED STATES PATENTS

| | | |
|---|---|---|
| 2,531,777 | Marshall | Nov. 28, 1950 |
| 2,575,571 | Wheeler | Nov. 20, 1951 |
| 2,580,678 | Hansen | Jan. 1, 1952 |
| 2,602,827 | Miller | July 8, 1952 |
| 2,632,809 | Riblet | Mar. 24, 1953 |
| 2,683,255 | Koos | July 6, 1954 |
| 2,764,739 | Fiet | Sept. 25, 1956 |

FOREIGN PATENTS

| | | |
|---|---|---|
| 625,378 | Great Britain | June 27, 1949 |
| 722,217 | Great Britain | Jan. 19, 1955 |